United States Patent [19]

Jones et al.

[11] 3,809,014

[45] May 7, 1974

[54] FLOORING SYSTEM FOR STIES AND OTHER ANIMAL SHELTERS

[76] Inventors: Robert S. Jones, R.R. 3, Pontiac, Ill. 61764; Wesley E. Jones, 707 Burnham Dr., Park Forest South, Ill. 60466

[22] Filed: Jan. 5, 1973

[21] Appl. No.: 321,386

[52] U.S. Cl. ............................................... 119/28
[51] Int. Cl. ............................................. A01k 1/00
[58] Field of Search ............ 119/16, 19, 28; 137/362

[56] References Cited
UNITED STATES PATENTS
3,677,229   7/1972   Blough et al. .......................... 119/16
3,528,391   9/1970   Johnson ................................. 119/28

Primary Examiner—Antonio F. Guida
Assistant Examiner—J. A. Oliff
Attorney, Agent, or Firm—William S. McCurry

[57] ABSTRACT

A flooring system for sties and other animal shelters utilizing thermoplastic slats and including means provided in the flooring for circulating a heat exchange fluid therethrough.

4 Claims, 5 Drawing Figures

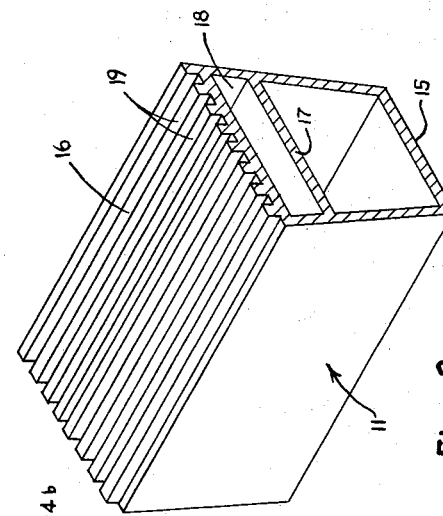
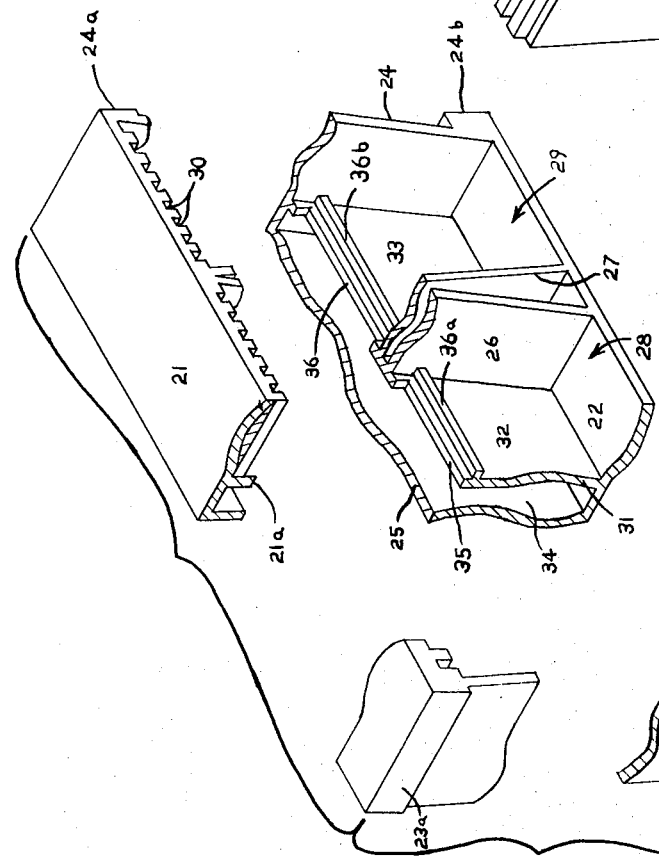

FLOORING SYSTEM FOR STIES AND OTHER ANIMAL SHELTERS

SUMMARY OF THE INVENTION

The present invention relates to sties and other animal shelters and more particularly to a flooring system for sties which is easily installed; easily maintained; non-corrosive; and is adapted for cooling and heating to provide comfort to the confined animals of the sty or other animal structure.

BACKGROUND OF THE INVENTION

For thousands of years farm animals were raised out-of-doors, seasonly, in an open field. Recently, however, due to the cost of land, the enlightened farmer and advanced technology in equipment and foods, the raising of animals has been brought indoors and is a year-round activity.

A major problem in raising animals indoors is one of sanitation, in that tons of manure are excreted by a single animal during its short life span. Another problem is providing climate comfort to the animals during both the winter and summer seasons.

The development of flooring systems for indoor shelters has progressed steadily over the past few years from concrete flooring, to concrete slotted flooring, to steel slat flooring, to aluminum slat flooring, and then to plastic slat flooring. All these prior floorings have advantages and disadvantages with respect to the sanitation and the heating and cooling problems. Concrete chips and corrodes and is difficult to keep clean; steel and aluminum are great heat conductors and are either hot or cold depending on the ambient temperature of the air of the shelter.

An object of the present invention is to improve the floor of a shelter by providing better materials of construction to provide easier installation and maintenance of the flooring.

Another object of the invention is to provide simple but novel heating and cooling of the flooring. Other objects and advantages will be apparent from the following detailed description of the flooring system, taken in conjunction with the appended drawings wherein:

THE DRAWINGS

FIG. 2 is a perspective, sectional view of the improved slat utilized in the present flooring system;

FIG. 3 is an exploded, perspective view, partly in section, of a coupler-manifold unit for coupling together the slats of the flooring of FIG. 1;

DESCRIPTION OF THE INVENTION

Figure 1:
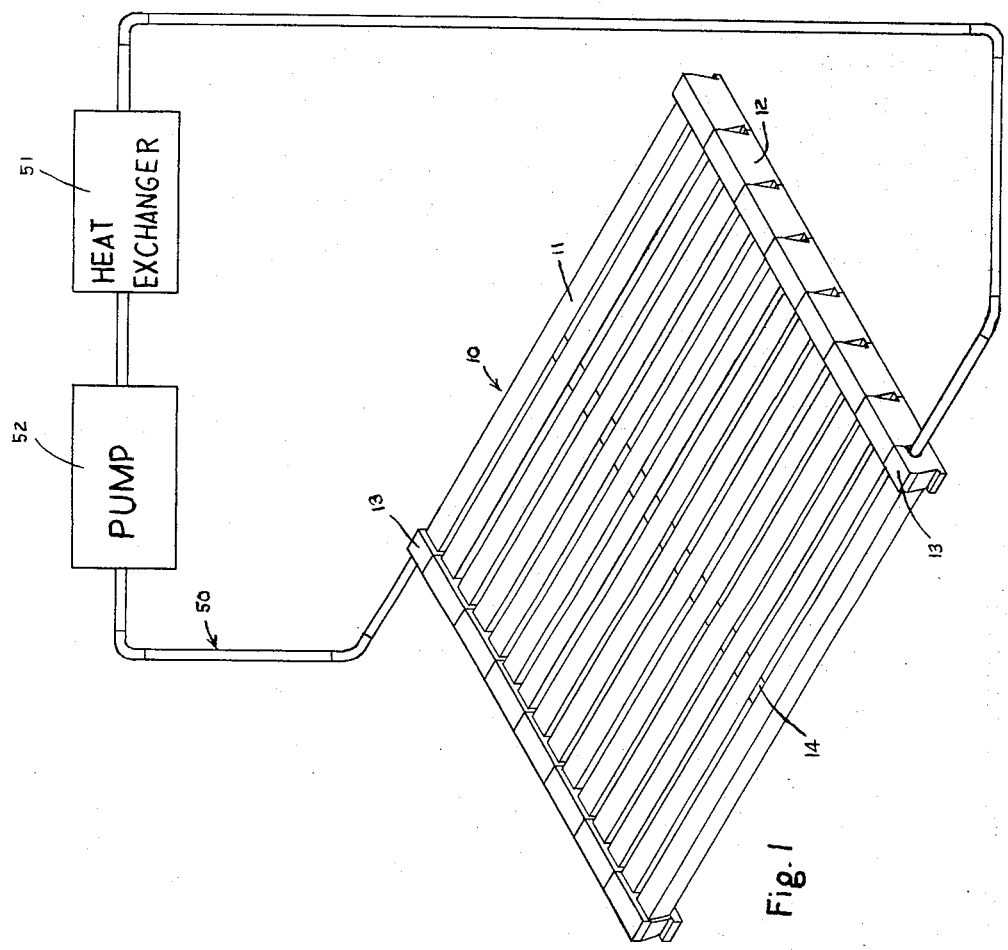
FIG. 1 is a perspective view of a floor for an animal shelter made in accordance with the present invention.

Referring to the drawings, there is disclosed in FIG. 1 a floor 10, made in accordance with the present invention and comprising a plurality of parallel, closely spaced slats 11, a plurality of dual cavity coupler-manifolds 12, two single cavity coupler-manifolds 13 at diametrically opposite corners of the flooring 10, and a plurality of slat spacers 14.

The individual slats 11, as best seen in FIG. 2, are elongated, tubular members which are trapezoidal-shaped in cross-section with a bottom wall 15 and a top wall 16. The bottom wall 15 is shorter than the top wall 16 to provide for easier egress of manure between the slats 11 into a drainage pit (not shown). A partition 17 is provided in the slat 11 to define a fluid passage 18. The fluid passage 18, as will be explained in more detail hereinafter, is in the upper one-half and preferably in the upper one-third or one-fourth of the slat 11, and is adapted to receive heated or cooled fluid from a conventional heat exchanger. It is important that the passage 18 be in at least the upper one-half of the slat 11 to prevent dissipation of the heat or cold, as the case may be, into the pit below the flooring. The top side 16 is provided with a plurality of ribs 19. The ribs 19 are multifunctional in that (1) they are traction surfaces to prevent slippage and give better footing for the animals and (2) they provide increased surface area for the dissipation of heat or cold from the fluid passing through the passage 18.

The slats 11 are preferably made of extruded thermoplastic material such as polyvinylchloride, polystyrene or ABS (graft copolymer of acrylonitrile, butadiene and styrene). Other and suitable extrudable materials such as, for example, aluminum may be employed in fabricating the slats 11.

The dual cavity coupler-manifold 12 is shown in FIG. 3. The coupler-manifold 12 is adapted to receive the open ends of two of the slats 11 and comprises a top wall 21, a bottom wall 22, inclined side walls 23 and 24, and a back wall 25. A pair of inclined partitions 26 and 27 are provided between the top wall 21 and bottom wall 22 so that the side walls 23, 24, together with the partitions 26 and 27, and the top and bottom walls 21, 22 respectively form trapezoidal shaped cavities 28, 29 for receiving two of the trapezoidal-shaped slats 11. Abutments 23a and 23b extend outwardly from the side wall 23; and abutments 24a and 24b extend outwardly from the side wall 24. The width of these abutments, as well as the distance provided between the inclined partitions 26 and 27 will determine the amount of space between the individual slats 11. In assembling the flooring as shown in FIG. 1, these abutments of the side walls 23 and 24 also provide surfaces for bonding by cementing or brazing the coupler-manifolds to one another when such bonding is desired. Grooves 30 are provided in the inside surface of the top wall 21 to receive the ribs 19 of the slats 11. The coupler-manifolds 12 and 13 are cemented, solvent welded, heat welded, brazed or otherwise bonded to the ends of the slats 11 which they receive. Common methods of joining thermoplastics and aluminum, as the case be, are used.

A partition 31 is provided in the coupler-manifold 12 to provide back walls 32, 33 for the cavities 28, 29 and to define a fluid passage 34. The partition 31 is recessed at 34, 36 to provide fluid passages connecting the passages 18 of the respective slats 11 with the passage 34. Projections 36a and 36b are provided in the back walls 32 and 33 of the partition 31. These projections extend for substantially the entire width of the walls 32, 33 and are substantially the same length as the partition 17 so that when the slat 11 is received within the cavity 28, for example, the ends of the bottom and side walls of the slat 11 will abut the wall 32. The projection 36a thus provides a support for the partition 17 and also a seal for fluid flowing from the passage 18 into the passage 34. A complimentary projection 21a depends from the top wall 21 to provide a stop and a seal for the top wall 16 when the slats and coupler-manifolds are assembled.

Figure 4:
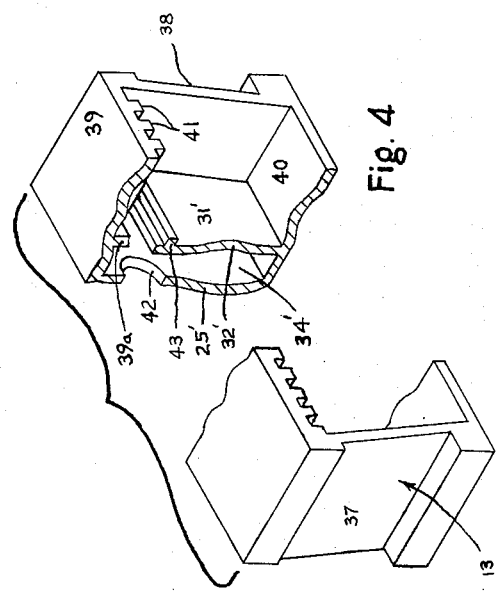
FIG. 4 is a perspective view of an end coupler-manifold for the slats.

FIG. 4 discloses the single cavity coupler-manifold 13. The member 13 is adapted to receive the open end of a single slat 11 and comprises side walls 37, 38, a top wall 39, a bottom wall 40, a back wall 25', grooves 41 for receiving the ribs 19 of the slat 11, and an aperture 42 in the wall 25' adapted to receive a conduit 50 from a conventional heat exchanger 51. The coupler-manifold 13 has a partition 31', a back wall 32', a depending projection 39a, a projection 43 and a fluid passage 34'. These elements serve the same purpose and function as corresponding partition 31, back wall 32, depending projection 21a, projections 36a and 36b and fluid passage 34 of the dual cavity manifold 12 hereinbefore described. A pump 52 is provided to circulate heat exchange fluid to and through the heat exchanger 51, the conduit 50, a first single cavity coupler-manifold 13, the passages 18 of the slats 11, the passages 34 of the coupler-manifold 12, and through the second single cavity coupler-manifold 13.

Figure 5:
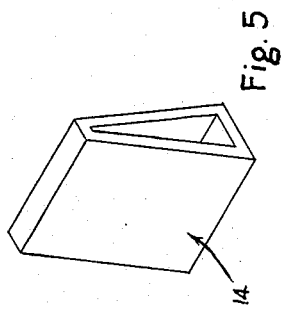
FIG. 5 is a perspective view of a spacer employed with the flooring of FIG. 1.

FIG. 5 discloses one of the triangular-shaped spacers 14 which may be necessary to reinforce slats 11 to provide a strong, rigid floor 10. The spacers 14 are cemented, brazed or otherwise secured in the triangular spaces formed by the side-by-side disposition of the trapezoidal-shaped slats 11.

The floor 10 of FIG. 1 is supported in a conventional manner over the normal sanitation pit of an animal shelter. Joists may be necessary when the slats 11 are, for example, greater than three feet in length. Such joists may be wooden, concrete, plastic, aluminum, steel or the like.

Thus, the present flooring system is non-corrosive to cement and metals, is easily constructed and maintained, and provides for heating and/or cooling of the flooring in an efficient manner.

While only one preferred embodiment of the invention has been described, it is understood that other changes and modifications can be made without departing from the spirit of the invention which is set forth in the claims.

We claim:

1. A flooring system for an animal shelter adapted to support animals above a sanitation pit comprising a plurality of parallel, closely spaced, elongated trapezoidal-shaped tubular members coupled together at both ends thereof by manifold means, said tubular members having a flat top wall and being provided with a partition to define a fluid passage in the upper one-half of said members, said manifold means defining at least one trapezoidal-shaped cavity for receiving the ends of said trapezoidal-shaped tubular members and defining interconnecting fluid passages for the transmission of fluid from the aforedefined fluid passage of one tubular member to the other, and means for circulating fluid through the fluid passages of said tubular members and said manifold means.

2. A flooring system as defined in claim 1 wherein said tubular members and said manifold means are made of a thermoplastic material.

3. A flooring system as defined in claim 2 wherein said tubular members and said manifold means are made of an acrylonitrile-butadiene-styrene thermoplastic material.

4. A flooring system as defined in claim 1 wherein said tubular members and said manifold means are made of aluminum.

* * * * *